United States Patent
Wang

(10) Patent No.: US 7,753,219 B2
(45) Date of Patent: Jul. 13, 2010

(54) REINFORCING FRAME STRUCTURE FOR A STORAGE RACK

(76) Inventor: Wen-Tsan Wang, 6Fl., No. 300, Jui Kuang Rd., Taipei City (TW)

( * ) Notice: Subject to any disclaimer, the term of this patent is extended or adjusted under 35 U.S.C. 154(b) by 114 days.

(21) Appl. No.: 12/172,276

(22) Filed: Jul. 14, 2008

(65) Prior Publication Data

US 2010/0006528 A1    Jan. 14, 2010

(51) Int. Cl.
  *A47F 5/14*  (2006.01)
(52) U.S. Cl. ............... 211/182; 211/189; 217/43 R; 217/65; 403/171
(58) Field of Classification Search .......... 211/182, 211/189, 191; 248/354.5; 312/257.1, 265.1, 312/108, 111, 140; 52/653.1, 655.1; 403/171, 403/176, 205, 403; 217/36, 43 R, 45, 65, 217/46; 220/9.1, 692, 693
  See application file for complete search history.

(56) References Cited

U.S. PATENT DOCUMENTS

| | | | | | |
|---|---|---|---|---|---|
| 1,489,068 | A | * | 4/1924 | Drake | ............ 403/387 |
| 1,781,825 | A | * | 11/1930 | Stoddard | ............ 217/19 |
| 1,824,900 | A | * | 9/1931 | Kaufman | ............ 403/231 |
| 2,179,843 | A | * | 11/1939 | Copeland | ............ 52/79.5 |
| 2,325,863 | A | * | 8/1943 | Johnson | ............ 217/54 |
| 2,485,647 | A | * | 10/1949 | Norquist | ............ 217/128 |
| 2,893,077 | A | * | 7/1958 | Erneman | ............ 52/648.1 |
| 4,493,425 | A | * | 1/1985 | Yoshida | ............ 211/189 |
| 5,468,086 | A | * | 11/1995 | Goya | ............ 403/260 |
| 5,658,483 | A | * | 8/1997 | Boeshart | ............ 249/191 |
| 2006/0150562 | A1 | * | 7/2006 | Simmons et al. | ............ 52/655.1 |

\* cited by examiner

*Primary Examiner*—Darnell M Jayne
*Assistant Examiner*—Patrick Hawn
(74) *Attorney, Agent, or Firm*—Leong C. Lei

(57) ABSTRACT

A reinforcing frame structure for a storage rack is disclosed having spacer blocks set in between outer rectangular open frame and inner rectangular open frame of each of top and bottom rectangular open frame units thereof at two sides of each of the upright supports at four corners, a reinforcing angle block attached to each rectangular open frame unit at each of the four corners at an inner side, and reinforcing pins transversely fastened to the inner and outer rectangular open frames, the spacer blocks and the reinforcing angle blocks at each of the four corners to reinforce the structural strength of the rectangular open frame units.

2 Claims, 6 Drawing Sheets

REINFORCING FRAME STRUCTURE FOR A STORAGE RACK

BACKGROUND OF THE INVENTION (a) Technical Field of the Invention

The present invention relates to bamboo or wood storage devices and more particularly, to a reinforcing frame structure for a storage rack.

(b) Description of the Prior Art

Many materials such as wood, bamboo, plastics, stainless steel, etc., are used for making storage boxes, racks, cabinets, drums, racks and etc. for keeping things. Wood or bamboo storage devices show an antique beauty. Small storage devices of wood or bamboo material are widely invited for storing jewelries and other small items.

A wood or bamboo storage rack generally comprises a multilateral top open frame, a multilateral bottom open frame, upright posts connected between the multilateral top open frame and the multilateral bottom open frame at each of the multiple corners, and wall panels fastened to each of the multiple sides. However, the dynamic analysis shows that the corner area of a wood or bamboo storage rack is the weakest point where a concentration of stress occurs. Because wood and bamboo are elastic when compared to metal, a wood or bamboo storage rack of the aforesaid design is less stable.

SUMMARY OF THE INVENTION

The primary purpose of the present invention is to provide a reinforcing frame structure for a storage rack, which has the structural strength of each of the four corners reinforced.

To achieve this and other objects of the present invention, the reinforcing frame structure comprises top and bottom multilateral open frame units, a plurality of upright supports respectively made of an angle bar and vertically connected between the top and bottom multilateral open frame units at each of multiple corners of the top and bottom multilateral open frame units, and reinforcing pins respectively transversely fastened to the top and bottom multilateral open frame units and the upright supports at each of the multiple corners to reinforce the structural strength.

Further, each multilateral open frame unit comprises an inner multilateral open frame, an outer multilateral open frame surrounding the inner multilateral open frame, and two spacer blocks set in between the outer multilateral open frame and the inner multilateral open frame at each of the multiple corners at two sides of each of the upright supports.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
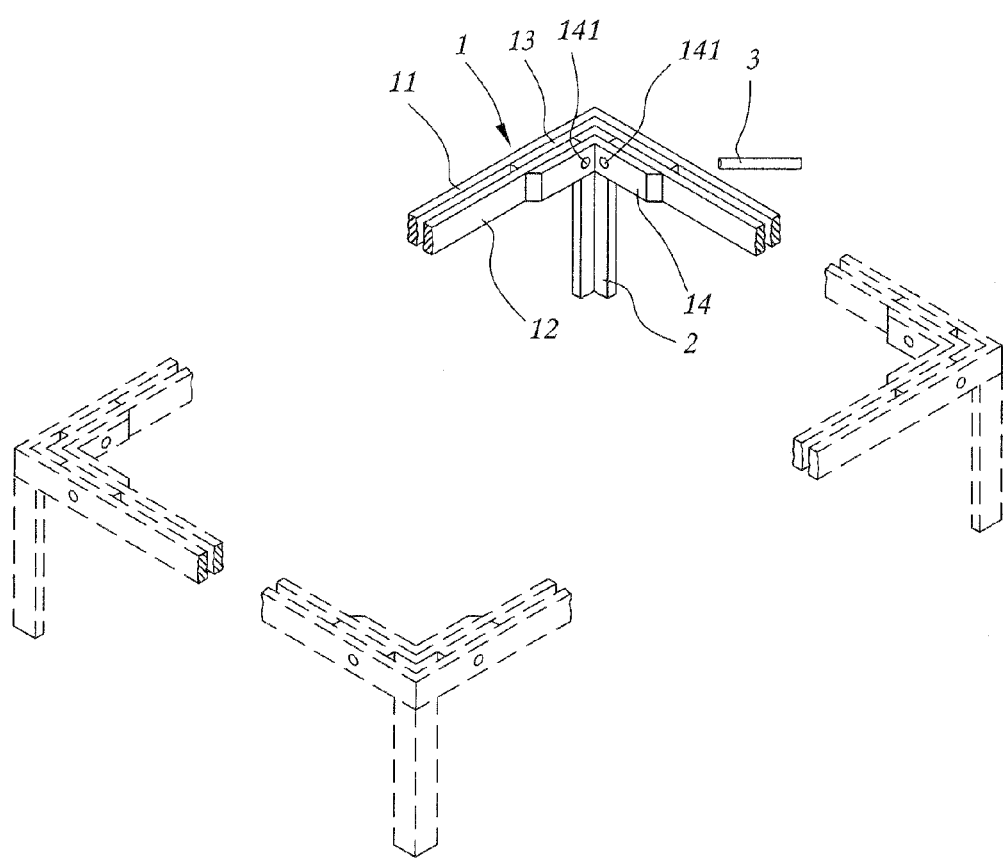
FIG. 1 is an exploded view of a reinforcing frame structure in accordance with a first embodiment of the present invention.
Figure 2:
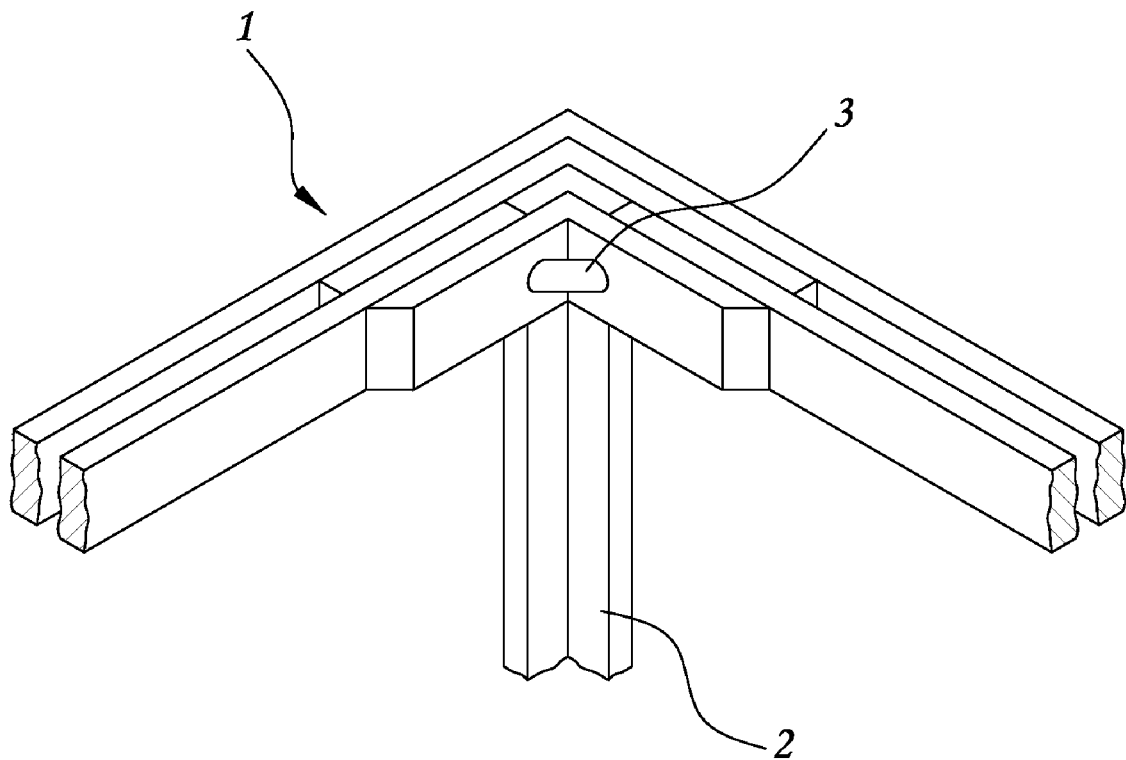
FIG. 2 is an elevational assembly view of FIG. 1.

Referring to FIGS. 1 and 2, a reinforcing frame structure in accordance with a first embodiment of the present invention is shown comprising a rectangular open frame unit 1 four upright supports 2, and a plurality of reinforcing pins 3. The rectangular open frame unit 1 comprises an inner rectangular open frame 12 containing four sections, an outer rectangular open frame 11 surrounding the inner rectangular open frame 12, four spacer blocks 13 set between the inner rectangular open frame 12 and the outer rectangular open frame 11 at four corners of the rectangular open frame unit 1 and bonded thereto with an adhesive, and four reinforcing angle blocks 14 bonded to the inner side of the inner rectangular open frame 12 at four corners of the inner rectangular open frame 12. The upright support 2 is an angle bar inserted into the gap between every two adjacent sections of the inner rectangular open frame 12 and bonded thereto with an adhesive, having the topmost edge thereof kept in flush with the inner rectangular open frame 12, the spacer blocks 13 and the outer rectangular open frame 11. Further two oblique through holes 141 are made through the reinforcing angle block 14, the inner rectangular open frame 12, the spacer blocks 13 and the outer rectangular open frame 11. The reinforcing pin 3 is press-fitted into the oblique through holes 141 and transversely extended through two sides of each of the outer rectangular open frame 11, the inner rectangular open frame 12 and the reinforcing angle block 14 to reinforce the structural strength of the rectangular open frame unit 1. Further, the inner rectangular open frame 12, the spacer blocks 13 the outer rectangular open frame 11 and the reinforcing angle block 14 may be made of bamboo or wood.

Figure 3:
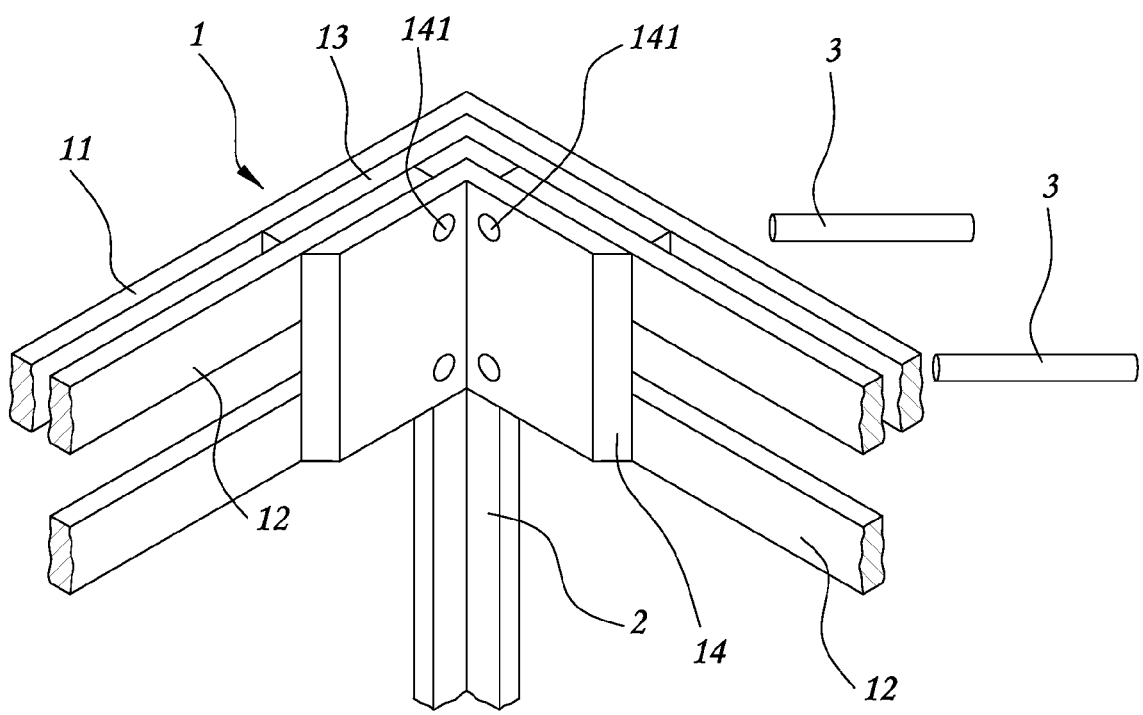
FIG. 3 is an exploded view of a reinforcing frame structure in accordance with a second embodiment of the present invention.
Figure 4:
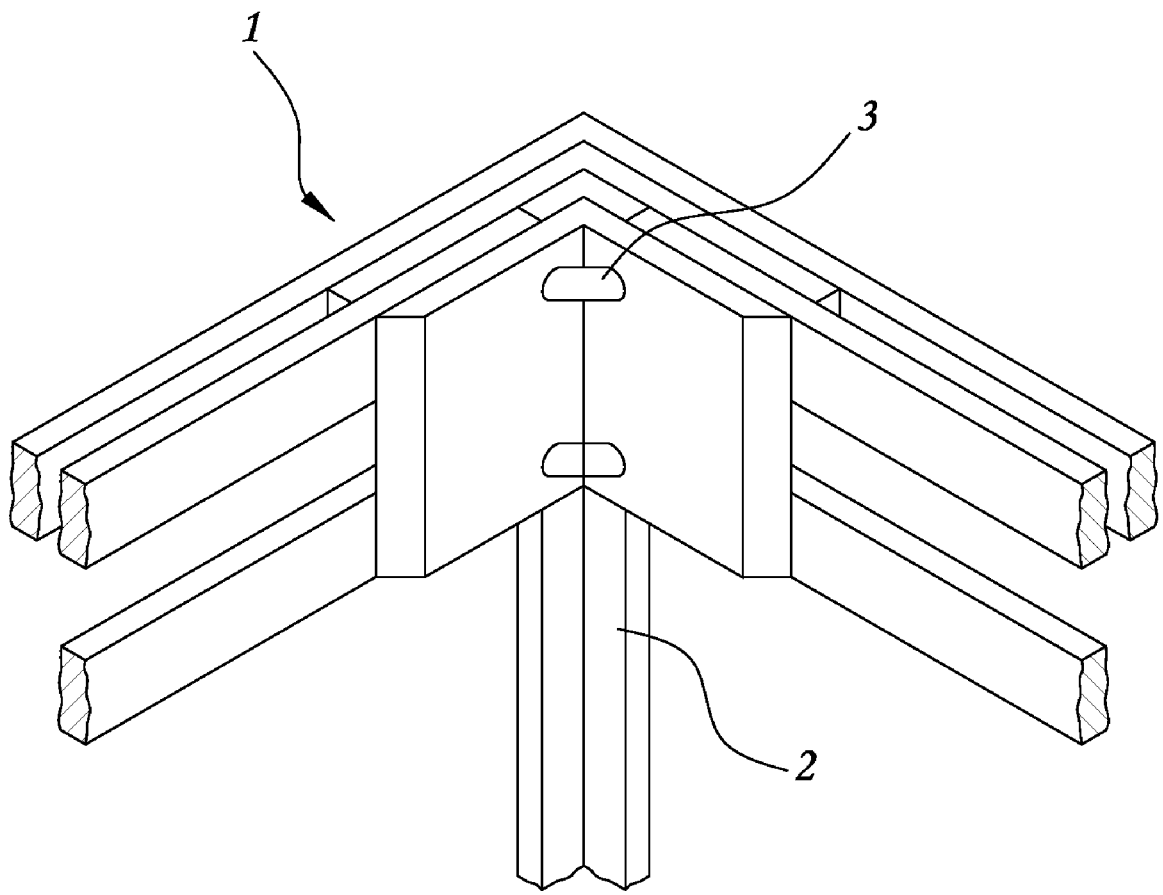
FIG. 4 is an elevational assembly view of FIG. 3.

Referring to FIGS. 3 and 4, a reinforcing frame structure in accordance with a second embodiment of the present invention is shown comprising a rectangular open frame unit 1 (only a part of the rectangular open frame unit is shown in the drawings), four upright supports 2, and a plurality of reinforcing pins 3. The rectangular open frame unit 1 comprises two inner rectangular open frames 12 having four sections and arranged at different elevations, an outer rectangular open frame 11 surrounding the upper inner rectangular open frame 12, four spacer blocks 13 set between the upper inner rectangular open frame 12 and the outer rectangular open frame 11 at four corners of the rectangular open frame unit 1 and bonded thereto with an adhesive, a plurality of reinforcing angle blocks 14 bonded to the inner side of the inner rectangular open frames 12 at four corners of the inner rectangular open frames 12. The upright support 2 is an angle bar inserted into the gap between every two adjacent sections of the inner rectangular open frames 12 and bonded thereto with an adhesive, having the topmost edge thereof kept in flush with the upper inner rectangular open frame 12, the spacer blocks 13 and the outer rectangular open frame 11. Further oblique through holes 141 are made through the reinforcing angle block 14, the inner rectangular open frames 12, the spacer blocks 13 and the outer rectangular open frame 11. The reinforcing pins 3 are press-fitted into the oblique through holes 141 and transversely extended through two sides of each of the outer rectangular open frame 11, the upper inner rectangular open frames 12 and the reinforcing angle block 14 to reinforce the structural strength of the rectangular open frame unit 1.

Figure 5:
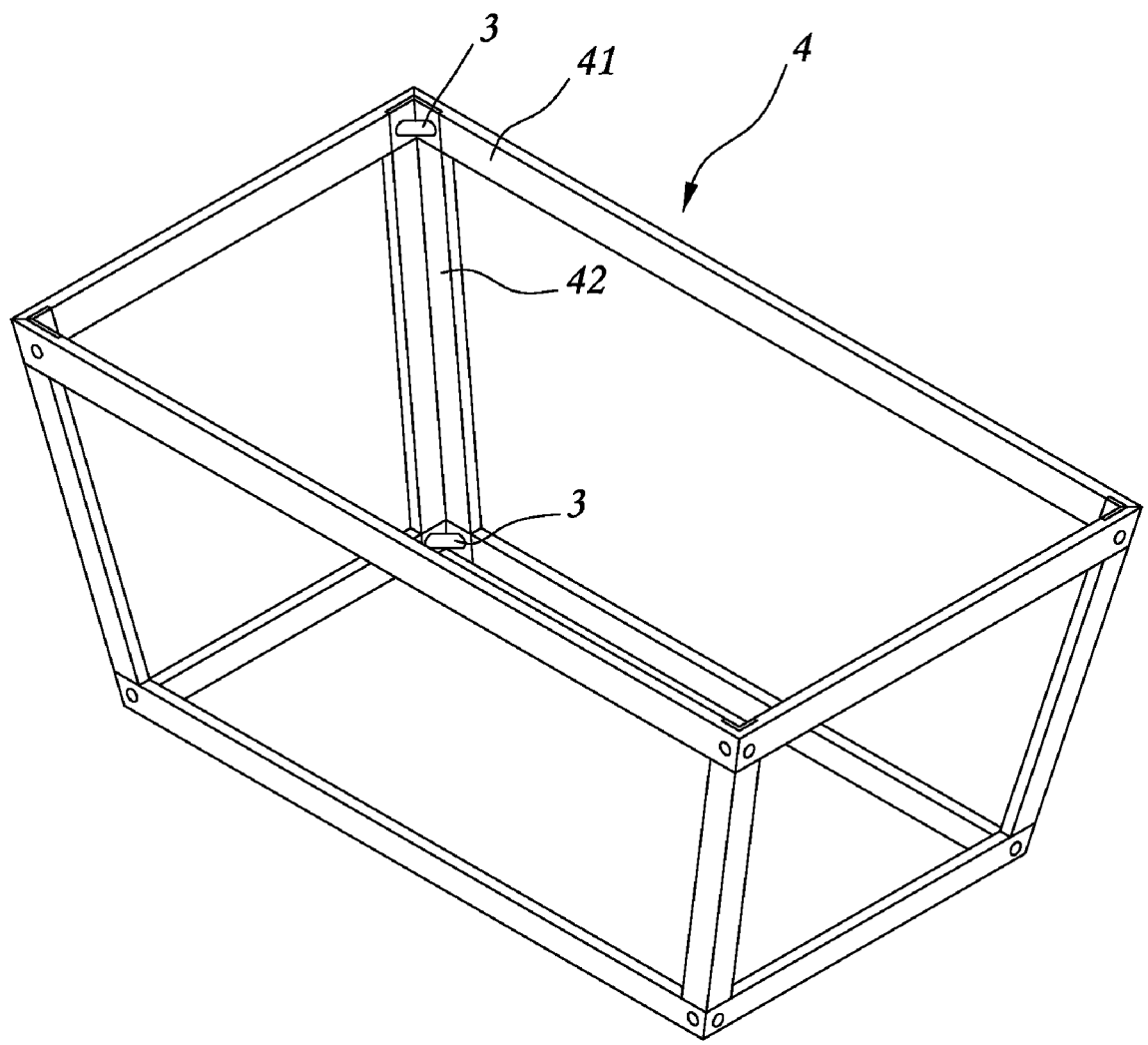
FIG. 5 illustrates one application example of the present invention.

FIG. 5 illustrates the present invention applied to a storage rack 4. The storage rack 4 comprises two rectangular open frame units 41 horizontally arranged at top and bottom sides, four upright supports 42 connected between the two rectangular open frame units 41 at the four corners, and reinforcing pins 3 respectively transversely fastened to the rectangular open frame units 41 and the upright supports 42 at the four corners at the top and bottom sides to reinforce the structural strength of the storage rack 4.

Figure 6:
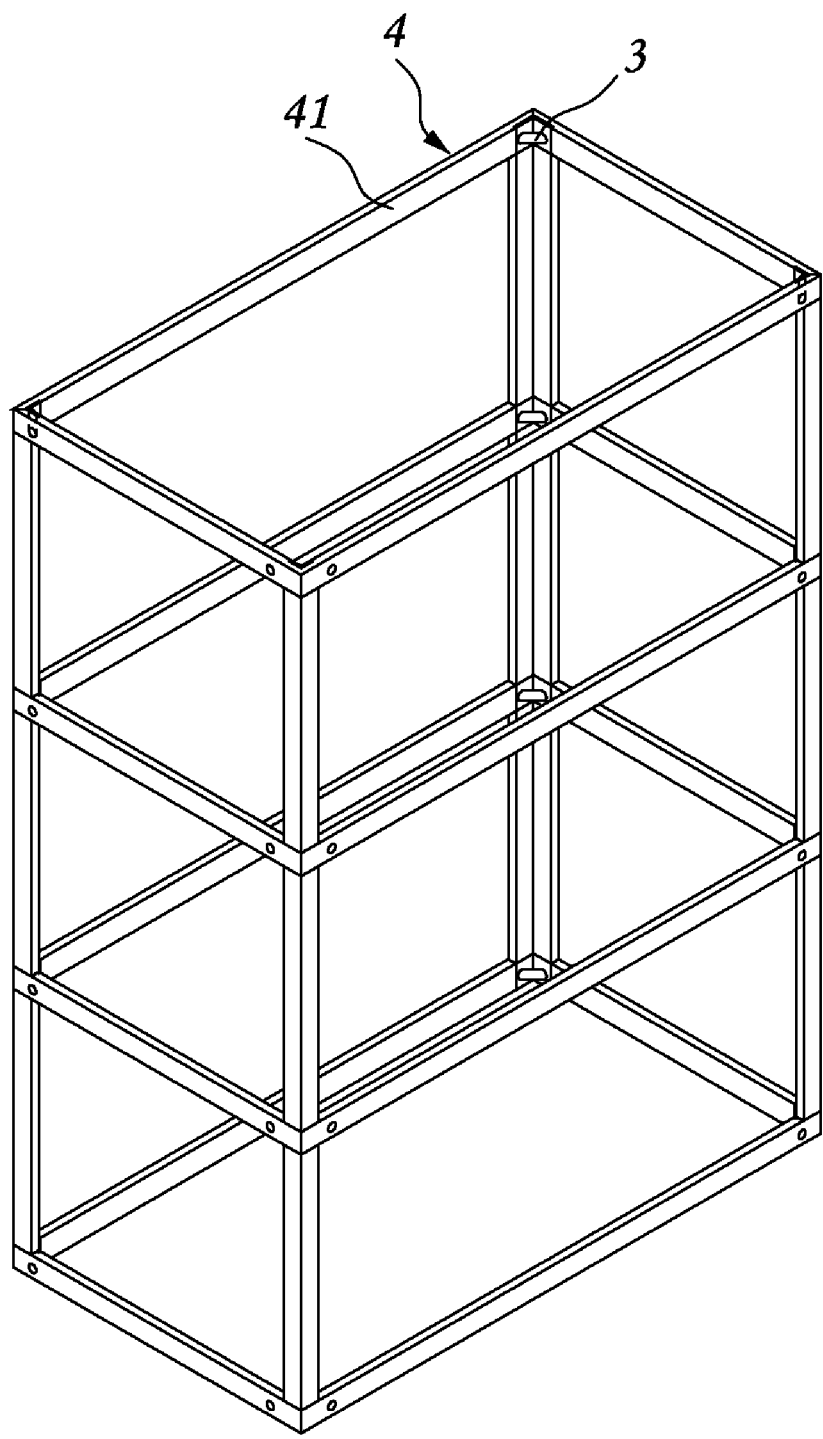
FIG. 6 illustrates another application example of the present invention.

FIG. 6 illustrates the present invention applied to a multi-layer storage rack 4 in which reinforcing pins 3 are respectively transversely fastened to the rectangular open frame units 41 and the upright supports 42 at the four corners at different elevations to reinforce the structural strength of the storage rack 4.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A reinforcing frame structure comprising:
    a rectangular open frame unit comprising an inner rectangular open frame containing four sections, and an outer rectangular open frame surrounding the inner rectangular open frame;
    four spacer blocks set between said inner rectangular open frame and said outer rectangular open frame at four corners of said rectangular open frame unit and bonded thereto with an adhesive;
    four reinforcing angle blocks bonded to an inner side of said inner rectangular open frame at four corners of said inner rectangular open frame;
    four upright supports each being an angle bar inserted into a gap between every two adjacent sections of said inner rectangular open frame and bonded thereto with an adhesive, having a topmost edge thereof kept in flush with said inner rectangular open frame, said spacer blocks and said outer rectangular open frame;
    two oblique through holes being made through said reinforcing angle block, the inner rectangular open frame, the spacer blocks and the outer rectangular open frame; and
    a plurality of reinforcing pins press-fitted into said oblique through holes and transversely extended through two sides of each of said outer rectangular open frame, said inner rectangular open frame and said reinforcing angle block to reinforce structural strength of said rectangular open frame unit.

2. The reinforcing frame structure as claimed in claim 1, wherein said rectangular open frame comprises an upper rectangular open frame and a lower rectangular open frame arranged at different elevations, said upper rectangular open frame being surrounded by said outer rectangular open frame, said spacer blocks being set between said outer rectangular open frame and said upper inner rectangular open frame, said reinforcing angle block being attached to said upper inner rectangular open frame and said lower inner rectangular open frame at an inner side opposite to said upright support.

* * * * *